US008214301B2

(12) United States Patent
Samuel et al.

(10) Patent No.: US 8,214,301 B2
(45) Date of Patent: Jul. 3, 2012

(54) SOCIAL NETWORK MAPPING

(75) Inventors: Arjmand M. Samuel, Redmond, WA (US); Sameer Halai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 12/567,210

(22) Filed: Sep. 25, 2009

(65) Prior Publication Data

US 2011/0078190 A1    Mar. 31, 2011

(51) Int. Cl.
*G06Q 99/00* (2006.01)
*G06Q 10/00* (2006.01)
(52) U.S. Cl. .......................................... 705/319; 705/1.1
(58) Field of Classification Search .................. None
See application file for complete search history.

(56) References Cited

U.S. PATENT DOCUMENTS

| | | | |
|---|---|---|---|
| 6,594,673 B1 | 7/2003 | Smith et al. | |
| 2006/0143081 A1 | 6/2006 | Argaiz | |
| 2008/0005073 A1 | 1/2008 | Meek et al. | |
| 2009/0198530 A1 | 8/2009 | O'Sullivan et al. | |
| 2010/0153284 A1* | 6/2010 | Hoag et al. .................... | 705/319 |

OTHER PUBLICATIONS

Blosser, et al.,"Privacy Preserving Collaborative Social Network", Retrieved at <<http://ieeexplore.ieee.org/stamp/stamp.jsp?arnumber=04511625>>,Location Busan, Apr. 24-26, 2008, pp. 543-548.

Schneier, Bruce, "Identifying People using Anonymous Social Networking Data", Retrieved at <<http://www.schneier.com/blog/archives/2009/04/identifying_peo.html>>, Apr. 6 2009, pp. 12.

Bojars, et al.,"Social Network and Data Portability using Semantic Web Technologies—Published Date: 2008", Retrieved at <<http://sunsite.informatik.rwth-aachen.de/Publications/CEUR-WS/Vol-333/saw1.pdf>>, ISWC 2008 conference in Karlsruhe (Germany), 2008, pp. 5-19.

Hoover, Alton,"Aristotle—A Social Networking Solution Designed and Built for the Air Force Research Laboratory" , Retrieved at <<http://peoplepointsystems.com/Aristotle_NAECON_PDF.pdf>>, Aug. 20, 2009, pp. 1-5.

Krichel, et al.,"A Social Network Analysis of Research Collaboration in the Economics Community", Retrieved at <<http://openlib.org/home/krichel/papers/nancy.pdf>>,Aug. 20, 2009, pp. 1-12.

* cited by examiner

*Primary Examiner* — Jonathan Ouellette
(74) *Attorney, Agent, or Firm* — Wolfe-SBMC

(57) ABSTRACT

Techniques for social network mapping are described. In an implementation, properties of a user's contacts with two services are analyzed to identify matching contacts. Contacts may be determined to correspond to the same user when sufficient common properties are found between the contacts. For unmatched contacts following the property analysis, additional processing may be conducted to identify contacts that the unmatched contacts have in common. A number of common contacts found through this processing may be used, alone or in combination, with information regarding common properties to determine when unmatched contacts correspond to the same user.

20 Claims, 5 Drawing Sheets

SOCIAL NETWORK MAPPING

BACKGROUND

The popularity of social networking via online networking sites is ever increasing. One way that people use social networking sites is to share information such as recommendations, pictures, videos, notes, discussions, and so forth on personal pages. However, some people maintain social networking accounts with multiple networking sites. Further, a person may wish to enable collaboration between their separate accounts.

Consequently, one challenge to enabling collaboration between multiple accounts of users is accurately correlating the users' contacts from different sites or services. Using a traditional approach, the person manually matched contact data between different sites and eliminated duplicate contacts. This manual correlation, though, may be quite inconvenient and disruptive for the user and therefore led to user frustration.

SUMMARY

Techniques for social network mapping are described. In an implementation, properties of a user's contacts with two services are analyzed to identify matching contacts. Contacts may be determined to correspond to the same user when sufficient common properties are found between the contacts. For unmatched contacts following the property analysis, additional processing may be conducted to identify contacts that the unmatched contacts have in common. A number of common contacts found through this processing may be used, alone or in combination with information regarding common properties, to determine when unmatched contacts correspond to the same user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Sometimes, a user may wish to enable collaboration between accounts used to access different services. One challenge to enabling collaboration between multiple accounts of a user is accurately correlating the user's contacts from different sites or services. Although the user could manually manage and update contacts with both services, this manual approach may be quite inconvenient and disruptive for the user which may even result in the user forgoing the functionality provided by the services due to user frustration.

Techniques for social network mapping are described. In an implementation, properties of a user's contacts with two services are analyzed via a mapping module to identify matching contacts. When sufficient common properties are found between two contacts, the contacts may be considered the same. Accordingly, the contacts may be merged into one contact entry for the user. In some embodiments, the two services may correspond to social network services from different providers. Although the following discussion describes some techniques in relation to social network services, the described techniques may also be employed with and among a variety services, including an email service, an instant messaging service, or other services for which users maintain contacts.

For unmatched contacts that are left after the property analysis, additional processing may be conducted to identify common contacts of the unmatched contacts. This may involve comparing properties of contacts associated with pairs of unmatched contacts to determine how many contacts the pair has in common. That is, the contacts of the user's contacts (e.g., friends of friends) are compared. The number of common contacts found for a particular pair of unmatched contacts through this processing may be used, alone or in combination with information regarding common properties, to determine when unmatched contacts correspond to the same user.

In the discussion that follows, a section entitled "Example Environment" describes an example environment and devices, which may be employed to provide social network mapping in various embodiments. Following this, a section entitled "Example Procedures" describes example techniques related to social network mapping in accordance with one or more embodiments. Last, a section entitled "Example Devices" is provided and describes example devices that can be used to implement one or more embodiments of techniques for social network mapping.

Example Environment

Figure 1:
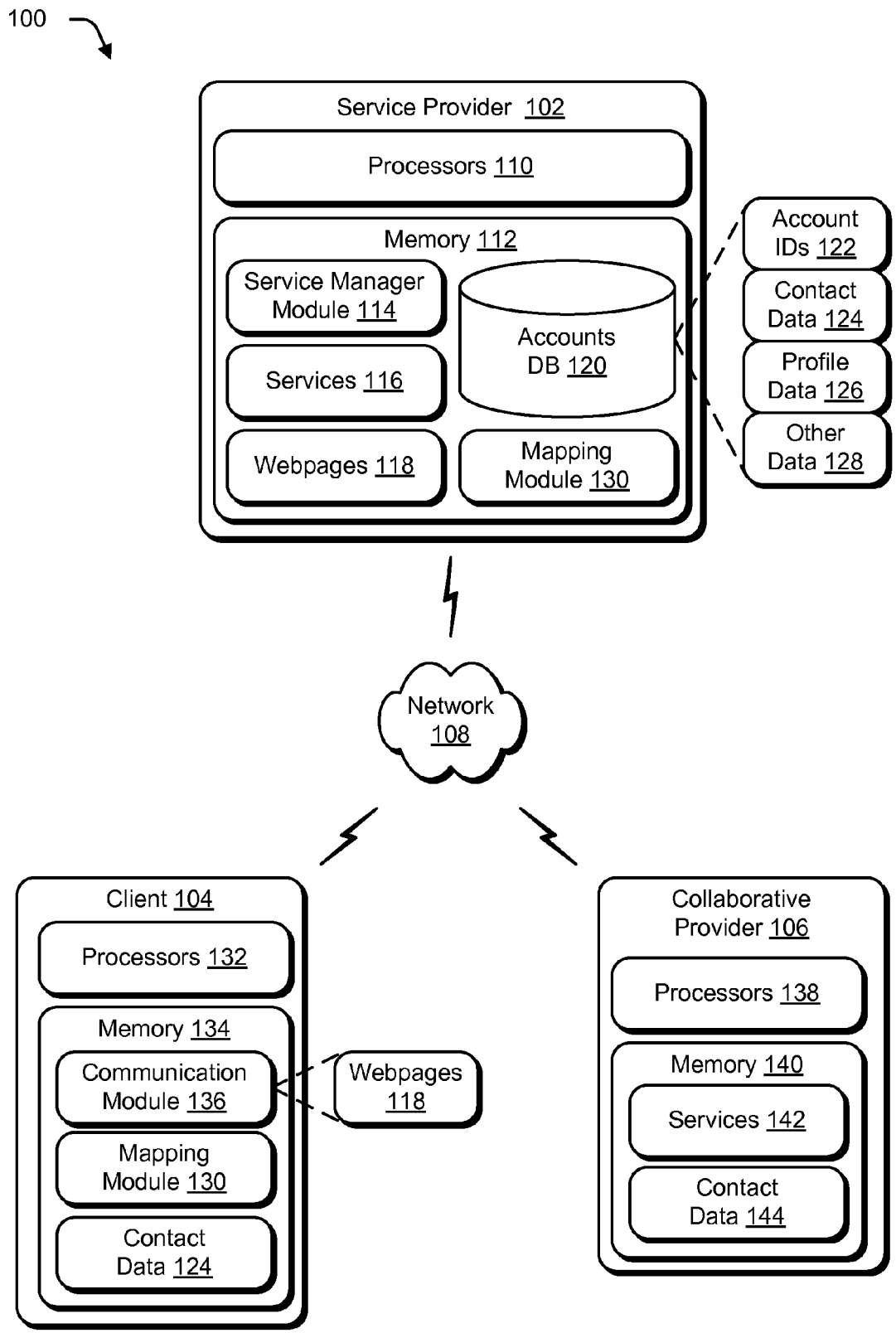
FIG. 1 is an illustration of an environment in an example implementation that is operable to provide social network mapping.

FIG. 1 is an illustration of an example environment 100 that is operable to provide social network mapping. The illustrated environment includes one or more service providers 102, one or more clients 104, and one or more collaborative providers 106, that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. The service provider 102 is depicted as storing a service manager module 114 in the memory 112 that is executable via the one or more processors 110. The service manager module 114 represents functionality operable by the service provider 102 to manage various services 116 that may be made available over the network 108. For example, various services 116 may be provided via webpages 118, or other user interfaces, that are communicated over the network for output by the one or more clients 104. The service manager module 114 may manage access to the services 116, performance of the services 116, configuration of webpages 118 to provide the services 116, and so on.

Some examples of the services 116 include, but are not limited to, a search service, an email service to send and receive email, instant messaging service to provide instant messages between clients 104, and a social network service to facilitate connections and interactions between groups of users who share common interests and activities. The social network service may assist users in connecting to a group, provide a variety ways for users to interact (e.g., group email, website, blog, messaging) and provide recommendations to the groups based on shared interests and activities. In at least some embodiments, the social network service may also be configured to enable network mapping and collaboration between different social networks in accordance with techniques described herein. Additional examples of services 116 include a shopping service, a weblog service, productivity service, authentication service, a news service, and an advertisement service to name a few.

The authentication service may be provided by the service manager module 114 to authenticate clients to access various services 116 that may be provided by one or more of the service providers 102. For example, a client 104 may provide a username and password that is authenticated by the authentication service. When the authentication is successful, the authentication service may pass a token, or other suitable data, to enable access to corresponding services 116. Authentication of the client 104 to an account may provide access to a single corresponding service provider 102 and/or service 116. Additionally or alternatively, a single authentication may correspond to many services 116, such that authentication to a single account provides access to many service providers 102 and/or to an entire suite of services 116.

The service manager module 114 may also manage an accounts database 120 that may be configured to store a variety of data related to user accounts with the one or more service providers 102. By way of example and not limitation, accounts database 120 is depicted as storing account identifiers 122 that may be used for authentication and access control (e.g., unique account IDs, usernames, passwords, and so on), contact data 124 that may define user contacts and/or social networks associated with accounts, and profile data 126 that may correspond to personal information and webpages accessible through a social network service and/or other services 116. In the context of social networks, a user's contacts may be referred to as friends. A variety of other data 128 is also contemplated, including service authorizations, user preferences, program files such as documents, pictures, and spreadsheets maintained online, and other data typically associated with user accounts.

Service provider 102 is also depicted as storing a mapping module 130 in memory 112 that is executable via the one or more processors 110 to implement aspects of social network mapping described herein. In an embodiment, functionality represented by the mapping module 130 may be implemented as an application programming interface (API) that may be made accessible to the clients 104 over the network 108.

The one or more clients 104 are depicted as having one or more processors 132 and memory 134. Memory 134 is depicted as storing another mapping module 130 that may be deployed to the client 104 and is executable via the one or more processors 132 to implement "client-side" aspects of social network mapping described herein. In an embodiment, functionality represented by the mapping module 130 may be implemented as a script that is included with a webpage 118 provided by the service provider 102.

Generally, mapping module 130 is configured to enable mapping of a user's contacts between accounts associated with different services 116 and/or different providers. While some techniques are described herein in relation to social network service, the described techniques are applicable to a variety services 116. To determine when two contacts are the same, mapping module 130 may be configured to take into account common properties of the contacts, e.g., what properties and how many properties are the same, and also the number of common contacts. Further discussion regarding the operation and configuration of one or more mapping modules 130 in various embodiments may found in reference to the following figures.

To enable various communications over the network 108, the one or more clients 104 may also include a communication module 136. The communication module 136 is depicted as being stored in memory 134 and is also executable via the processor 132 to provide various interactions with service providers 102 and/or services 116. Examples of such interaction include, but are not limited to, communicating one to another, navigating content, searching webpages, accessing services 116, interacting with a social networking site, performing searches, instant messaging, email, and so forth.

The communication module 136 may be implemented as a browser or other suitable application to obtain and output webpages 118 from the service provider 102 over the network 108. The communication module 136 may also represent a component of another application used to obtain one or more services 116 from the service providers 102. For example, the communication module 136 may be configured as a component of a desktop social networking application of a client 104.

As noted above, the mapping module 130 may be configured to map contacts between accounts associated with different services 116 and providers of the services 116. The mapping module 130 may be employed in conjunction with different services 116 from the same provider. The mapping module 130 may also be employed in conjunction with services provided by separate providers. The collaborative providers 106 illustrated in FIG. 1 may represent external providers with which a service provider 102 may collaborate and perform mapping. The one or more collaborative providers 106 may be configured in manner similar to the service providers 102 as discussed above.

In particular, the one or more collaborative providers 106 are depicted as having one or more processors 138 and memory 140. A variety of services 142 that may be configured in a manner similar to the services 116 are depicted as being stored in the memory 140. The collaborative provider 106 is also depicted as storing respective contact data 144 in the memory 140. The contact data 144 represents users' contacts related to the services 142 and/or accounts of the users' with a collaborative provider 106.

Having considered devices and components of an example environment, consider now example procedures for social network mapping that may be implemented in the environment using the example components, as well as in other environments.

Example Procedures

The following discussion describes techniques for social network mapping that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
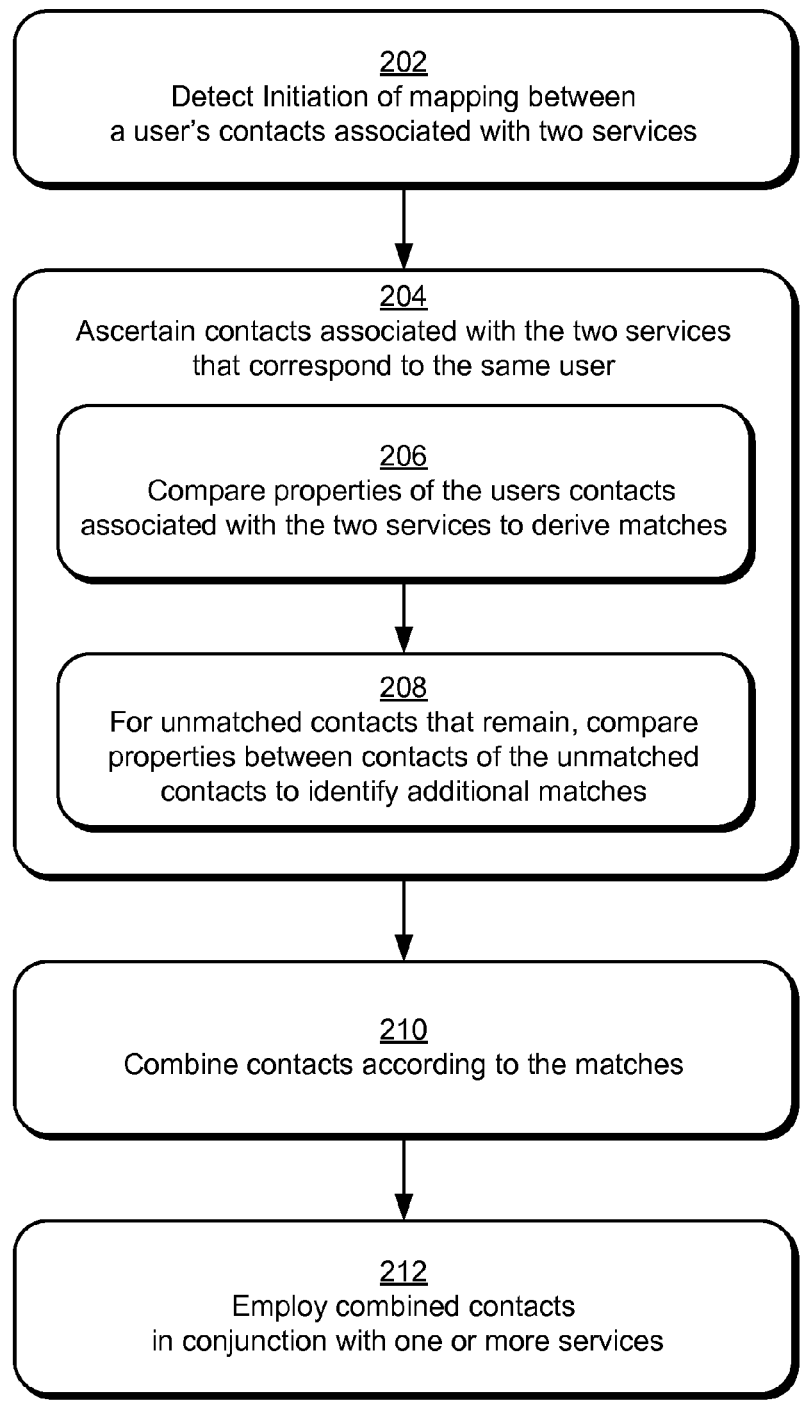
FIG. 2 a flow diagram depicting a procedure in an example implementation in which mapping occurs between a user's contacts associated with two services.

FIG. 2 depicts a procedure 200 in an example implementation in which mapping occurs between a user's contacts associated with two services. In at least some embodiments, procedure 200 may be performed by a suitably configured service provider, such as service provider 102 of FIG. 1 having a mapping module 130. Additionally or alternatively, procedure 200 may be performed by a mapping module 130 that is deployed to a client 104, or by a client 104 and service provider 102 in combination.

Initiation of mapping between a user's contacts associated with two services is detected (block 202). For example, a user may make a selection to import, sync, or otherwise combine sets of contacts that the user may have for interaction with different services 116. The services 116 may be provided by the same service provider 102 or by different providers. The selection may be detected by a mapping module 130 that is configured to perform the mapping.

Consider an example user Scott who has a user account with a service provider 102, such as the service provider 102 of FIG. 1. Scott may interact with a communication module 136 of a client 104 to obtain services 116 from a service provider 102. In at least some embodiments, Scott's interaction may involve using a social network service available from the service provider 102. Of course, Scott may interact with a variety of services 116 that may be available from the provider as discussed above, and for which mapping may be performed.

Scott may be presented with an option to sync his contacts between multiple services 116. For example, Scott may be able to sync contacts between a social network service and an email service with the service provider 102. In another example, Scott may be able to sync his contacts between one social network with the service provider 102 and another social network of Scott's with another provider, such as a collaborative provider 106 shown in FIG. 1. Other examples include syncing between multiple instant messaging services, between email service and instant messaging service, and/or between contacts maintained locally on a client device of Scott's (e.g., a local contact database) and a service 116 from the service provider. Scott's may initiate the syncing on his own, such as by selecting a menu item or other suitable control exposed in a webpage output via the communication module 136. In an embodiment, an option to sync contacts may be presented to Scott automatically when Scott signs up with the service provider 116, when Scott activates one of the services 116, and/or when Scott interacts with his contacts. In each of these scenarios, selection of the option by Scott initiates mapping between contacts associated with services used by Scott.

In response to the initiation, the procedure 200 may proceed to ascertain contacts associated with the two services that correspond to the same user (block 204). This involves comparing properties of the user's contacts with the two services to derive matches (block 206). For example a property-based comparison may occur for each contact of Scott's to identify properties that the contact has in common with other contacts of Scott's. In one example, properties that are compared may include at least account identifiers, user names, and locations. Based on this comparison, an assessment may be made as to whether certain contacts that Scott has with the different services correspond to the same user. The property-based comparison enables the number of unmatched contacts to be successively reduced.

For contacts that remain unmatched, a comparison is made between properties of contacts of the unmatched contacts (e.g., friends of friends) to identify additional matches (block 208). This analysis of unmatched contacts may determine a number of common contacts that exist between two of the unmatched contacts. The number of common contacts may be used alone or in combination with common properties discovered in block 206 to determine when the unmatched contacts correspond to the same user. It should be appreciated that mapping of contacts may occur according to various matching techniques. Further details and examples regarding using properties to map contacts one to another are discussed in greater detail in relation to the example procedure depicted in FIG. 3.

Contacts are combined according to the matches (block 210). One way this can occur is by creating updated contact data 124 that combines (e.g., merges) contacts determined to match. Unmatched contacts may be added as their own entries in the contact data 124. In an embodiment, unmatched contacts may be presented to a user to allow the user to engage in manual mapping of the unmatched contacts, delete the contacts, and so forth.

The combined contacts may be employed in conjunction with one or more services (block 212). For example, the combined contacts may be used to send out communications (email, instant messaging, invites) to a user's contacts while reducing duplicates. The combined contacts may also facilitate collaborative interactions of services, such as cross communicating posts from one social network to another, content provisioning, sending status updates and suggestions, pushing content to the contacts, and so forth.

Figure 3:
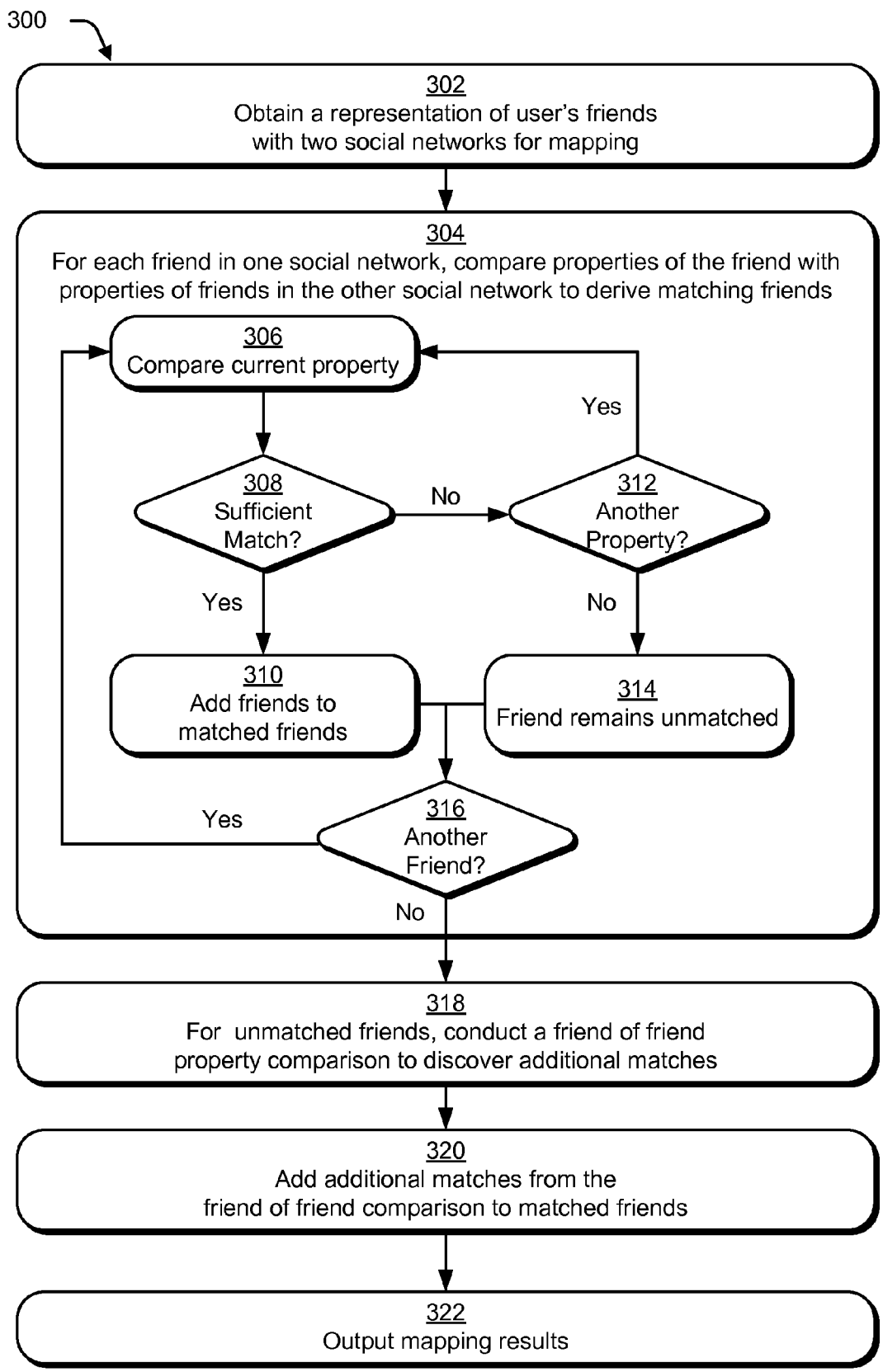
FIG. 3 is a flow diagram depicting a procedure in an example implementation in which mapping of contacts occurs between two social networks of a user.

FIG. 3 depicts a procedure 300 in an example implementation in which mapping of contacts occurs between two social networks of a user. Although FIG. 3 is described in relation to a particular example of two social networks, procedure 300 is more generally applicable to mapping of contacts between services. For instance, at least a portion of procedure 300 may represent example details involved in ascertaining of contacts that correspond to the same user as per block 204 of FIG. 2.

In at least some embodiments, procedure 300 may be performed by a suitably configured device, such as a device configured to make use of a mapping module 130 described in relation to FIG. 1. The mapping module 130 may be implemented to perform mapping by way of both a client 104 and a service provider 102, individually and/or in a distributed manner.

A representation of a user's friends with two social networks is obtained (block 302). Consider, for example, a user Bob who has one social networking account with a service provider 102 and another social networking account with a collaborative provider 106. A different set of friends associated with Bob may be maintained by each of the providers. At least some of Bob's friends from the different social networks may relate to the same person. Moreover, people (e.g., Bob's friends) may use different user names and identifiers with different providers. Accordingly, simply matching user identifiers may be insufficient to determine which friends of Bob correspond to the same person. Yet, Bob may wish to sync his contacts between the multiple social networks for various reasons, such as to enable collaboration between the social networks.

Social network mapping techniques described herein may be employed to perform automatic mapping between Bob's social network in a user friendly and efficient manner. To do so, social network mapping techniques make use of various properties associated with Bob's friends.

In particular, initiation of mapping of Bob's friends in the two social networks may occur in various ways, such as those discussed previously in relation to procedure 200 of FIG. 2. The initiation may be detected by a mapping module 130. In response, the mapping module 130 may operate to perform the mapping.

To enable the mapping, the mapping module 130 may be configured to interact with both the service provider 102 and the collaborative provider 106 to obtain representations of Bob's friends with each provider. For instance, the mapping module 130 may obtain contact data 124 and contact data 144 that describes Bob's friends in social networks with the service provider 102 and the collaborative provider 106, respectively. The mapping module 130 may be configured to examine an account of Bob's to identify social networks corresponding to Bob. This may include identifying account ids, links, authentication information, and/or other data that may enable mapping module 130 to obtain corresponding contact data.

In some cases, Bob may provide input to cause the mapping, such as by selection of a sync operation. Optionally, Bob may also upload files, input links to files, or otherwise designate particular files or locations of files that describe Bob's friend. The mapping module 130 may perform the mapping using the files that are designated by Bob.

In at least some embodiments, social network mapping techniques makes use of a common data format to represent contacts/friends associated with different services and/or providers. The common data format used for mapping may be configured in a variety of ways to represent contacts of a user. In general, the common data format describes a user's contacts corresponding to a particular service 116 and includes various properties that are associated with the contacts/ friends. By way of example and not limitation, the common data format may be implemented as a graphical representation, structured data, a relational database document, a mark-up language document, delimited documents, or other suitable representations of contacts.

In one or more embodiments, data employed for mapping may be pre-configured in a manner suitable for mapping. For instance, a service provider 102 and/or a collaborative provider 106 may be configured to maintain contact data 124 and contact data 144 respectively in the common data format to facilitate mapping. In this example, the mapping module 130 may obtain data from one or more providers that is already in the common data format and may make use of the data directly for mapping.

Additionally or alternatively, the mapping module 130 may be configured to convert data to the common data format from other formats that may be used by various providers. For instance, different providers often may make use of different and/or custom formats for respective contacts. Accordingly, the mapping module 130 may operate to determine whether contact data is in a compatible format and perform conversion to place data in a format suitable for mapping when data is not already in a suitable format.

Thus, in the example of Bob's friends, the mapping module 130 may obtain data describing Bob's network of friends from both the service provider 102 and the collaborative provider 106 and ascertain whether this friend data is in a suitable format for mapping to occur. The mapping module 130 may also perform conversion of the friend data to a suitable format when the friend data is not already in a suitable format. Having obtained data regarding Bob's friend, mapping module 130 may proceed to conduct mapping operations using the obtained data.

In particular, for each friend in one of the social networks, properties of the friend are compared to properties of friends in the other network to derive matches. (block 304). A variety of different suitable techniques and algorithms may be employed by a mapping module 130 to derive matches between friends in two social networks. In general, procedure 300 may cycle through comparisons of a number of different properties for each friend to detect friends between the networks that match, e.g., friends who correspond to the same user.

A variety of properties are contemplated that may be compared by the mapping module 130 to derive matches. The common data format noted above may define a common set of properties to facilitate mapping. Providers that make use of the common data format may populate the common set of properties when a user registers and/or when a user makes additions to their contacts. Further, conversion of data that is not in a suitable format into the common format may include populating the common set of properties.

The properties may include a variety of data typically employed in user profiles and contact information. As noted above, properties suitable to perform mapping may include account information such as account identifiers, user names, and location. Other example properties include, but are not limited to, names (initials, first name, last name, middle name, maiden name), email address, street address, telephone number, education information (degrees, high school, college), relationship status, age, sex, race, birthday, birth place and so forth. Naturally, properties may be employed in a manner consistent with a user's security settings. Thus, a user may enable or disable use of some or all of properties for mapping, as well as for other purposes.

One example property-based matching process involving successive comparisons of a set of properties for each of a user's friend is depicted and described just below in relation to blocks 306 to 316 of FIG. 3.

In particular, a current property is compared (block 306). In the preceding example, this may involve comparing a particular friend of Bob's in his social network with the service provider 102 with each friend in his social network with the collaborative provider 106 until a match is determined. Moreover, after each property is compared for the particular friend, a determination is made regarding whether there is a sufficient match (block 308). The sufficiency of a match may be determined in a number of ways. For example, a confidence threshold may be established and employed to determine when it may be said with confidence that contacts/friends correspond to the same person.

Thus, the determination of block 308 may involve assessing whether the confidence threshold has been met. In an embodiment, the confidence threshold may be configured to define a number of matching properties in order to establish a match between contacts. In another example, the confidence threshold may be configured to define a percentage of matching properties (e.g., 70% or 5 of 10).

In yet another example, the confidence threshold may set an overall point score to be achieved to establish a match. In this example, different properties may be assigned different values. In this manner, the relative weight of different properties in the sufficiency determination may be configured by assigning values accordingly. For instance, a location property may be assigned a higher value than an age property. The values of matching properties may be summed and compared to the overall point score to determine when a match is sufficiently established.

When a match is determined from the property comparison, the matching friends are added to a list of matched friends (block 310). On the other hand, when the comparison of properties has not resulted in a sufficient match, a determination is made regarding whether there is another property to check (block 312). When additional properties exist that are to be compared, procedure 300 returns to block 306 to repeat the comparison for the particular friend and the next property. Thus, the comparison of block 306, match determination of block 308, and property determination of block 312 may be repeated for each property, until a match is made for a particular friend, or until the set of properties to be compared has been exhausted. If the set of properties is exhausted without a match, the friend remains as an unmatched friend (block 314).

A determination is made as to whether there is another friend to analyze for matches (block 316). If so, the property-based matching process of blocks 306 to block 316 just described is repeated for the other friend and for each property of the set of properties to be checked, or until a match is determined. Thus, the property-based matching process may be repeated for each friend of Bob's social network.

Although a successive process for matching is illustrated, alternatively matching depicted in relation to block 304 may occur using other techniques. For example, matching may be conducted concurrently for two or more friends by way of separate processing threads, modules, and/or processors. In another example, multiple properties may be checked before the sufficiency of a match is determined as in block 308. In any event, mapping module 130 may conduct mapping in a manner suitable to identify matching friends and some friends that remain unmatched friends.

At this point, further processing may occur to find additional matches from the yet unmatched friends. In particular, for each unmatched friend, a friend of friend property comparison is conducted to discover additional matches (block 318), and additional matches discovered by the friend of friend analysis are added to the list of matched friends (block 320).

As noted, there may be some friends that remain unmatched friends following the property comparison described in relation to block 304. A friend of friend comparison may be considered a deeper level of mapping that is conducted using the yet unmatched friends of the two social networks. In general, the comparison is conducted to identify common friends associated with the unmatched friends. Specifically, friends corresponding to a pair of unmatched friends may be compared, e.g., one friend from each of the two social networks being mapped. This friend of friend comparison makes use of property-based comparisons similar to those described above. Such comparisons may be employed to determine if there are common friends between the pair of unmatched friends. The friend of friend comparison may repeat some or all of the mapping analysis described in relation to blocks 302 to 316, this time using the friends corresponding to a pair of unmatched friends. A determination of whether the unmatched friends correspond to the same person may be made based at least in part upon the number of common friends discovered. The greater the number of common friends, the greater the likelihood is that the unmatched friends correspond to the same person. This determination may also consider matching properties between the unmatched friends that may have been found through the previous matching process of block 304. In other words, the results of analysis described in relation to blocks 304 and 318 may be combined to discover additional matches among initially unmatched friends.

By way of example, assume that a friend Ken in Bob's social network with the service provider 102 and a friend Kenny in Bob's social network with the collaborative provider 106 are unmatched following the mapping analysis above. Perhaps some properties were matched between Ken and Kenny, but not a sufficient number of properties to confidently conclude that Ken and Kenny correspond to the same person or user. Assume for example that the property matching analysis found that a first name Kenneth and a location of Oregon were associated with both Ken and Kenny. These matched properties provide some indication that Ken and Kenny are the same, but may not be sufficient based on the confidence threshold.

Accordingly, a friend of friend comparison may be performed by the mapping module 130 to provide further information that may be used to assess whether or not Ken and Kenny are the same. In particular, friends in Ken's social network with service provider 102 may be compared to friends in Kenny's social network with collaborative provider 106 using property-based comparisons. Through this analysis, mapping module 130 may identify a number of friends that are common to Ken and Kenny.

The mapping module 130 may make use of the number of common friends in a variety of ways to determine whether that Ken and Kenny match. This may involve determining whether a defined threshold value for a number or percentage of common friends has been met. If the threshold is met, this may be sufficient to conclude that a pair of unmatched friends is the same. In the present example, the threshold may be configured such that identification of five common friends or more than 50% of common friends may be sufficient to conclude that Ken and Kenny are the same.

The number of common friends may be used alone or in combination with previously determined property matching information. For instance, a value may be assigned to the number of common friends that is added to an overall point score derived through property matching described above. In another example, the threshold value for the number of common friends may be adjusted based upon the number of common properties found through property matching. In general, a match between friends may be found with a fewer number of common friends as the number or value of common properties increases. For example, if only 4 common friends are identified between Ken and Kenny, this still may be sufficient to conclude that Ken and Kenny are the same considering that property matching determined that they share the name of Kenneth and the location of Oregon. Thus, mapping module 130 may be configured to take into account common properties, e.g., what properties and how many properties of Ken and Kenny are the same, and also the number of common friends they have.

Results of the mapping are output (block 322). In at least some embodiments the results may be a list, or other suitable data, that merges matching friends into single list entries. For example, mapping module 130 may be configured to produce a combined friends list for Bob based on the foregoing analysis. The mapping module 130 may output the combined list for use by the user, service provider 102, and/or collaborative provider. For example, the combined list may be used to update or replace Bob's contacts with the service provider 102 and/or the collaborative provider 106. Further, the combined list may be used in conjunction with one or more services 116 provided by the service provider 102 and/or the collaborative provider 106. The combined list may also be used to enable collaboration between the two social networks, such as to set content permissions, distribute updates, make friend suggestions, and so forth.

Figure 4:
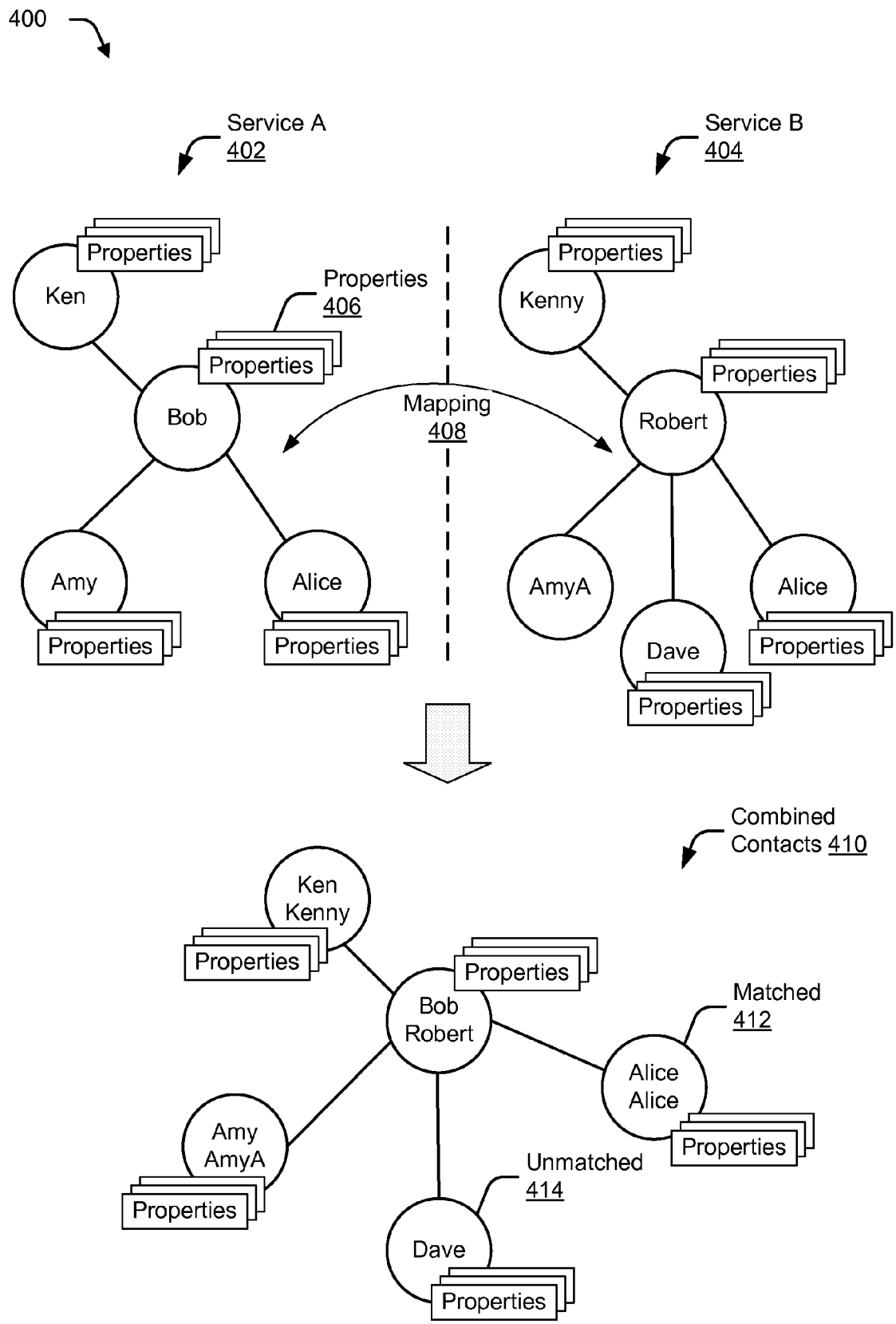
FIG. 4 is a diagram depicting depicts an illustrative example of mapping that may occur for contacts with two services.

Referring to FIG. 4, a diagram 400 depicts an illustrative example of mapping that may occur for contacts with two services. In particular, FIG. 4 includes representations of contacts for a user Bob with Service A 402 and with Service B 404. As depicted, Bob uses the name "Bob" with Service A 402 and "Robert" with Service B 404. Each of the services may correspond to an email account, instant messaging account, social network, or other service account of Bob's.

In the depicted example, the representations of Bob's contacts with each service are configured as graphical representations. Representations may be also configured in other suitable formats as described above. It just so happens that for this example graphical representations are employed. The mapping module 130 may be configured to construct such graphical representations, or other representation, using contact data for the services that is associated with Bob. In the depicted graphical representations, each of Bob's contacts is associated with a set of properties 406. The properties 406 that may be used to determine when Bob's contacts with Service A correspond to his contacts with Service B. In particular, FIG. 4 illustrates a mapping operation 408 that may occur using comparisons of the properties 406 to determine matches between Bob's contacts.

The mapping operation 408 may occur using a variety of techniques including, but not limited to, techniques described above in relation to procedure 200 of FIG. 2 and procedure 300 of FIG. 3.

Generally, the mapping operation 408 involves analyzing properties to identify common properties among the contacts and determining matches based on the common properties. Mapping operation 408 may also involve processing to determine common contacts that exist between the contacts. In other words, contacts that are shared by two of Bob's contacts may be identified to assist in determining when the two contacts correspond to the same person. Matching contacts may be arrived at based on common properties alone, based upon common contacts alone, or based upon both common properties and common contacts that are shared by two of Bob's contacts.

The result of the mapping may be a combined representation of the contacts, such as the combined contacts 410 depicted in FIG. 4. The combined contacts 410 may include matched 412 contacts and unmatched 414 contacts. In the illustrated example, matches between Bob's contacts with Service A 402 and Service B 404 that are determined through mapping operation 408 include Ken to Kenny, Bob to Robert, Alice to Alice, and Amy to AmyA. Dave is entered into the combined contacts 410 as an unmatched 414 contact, since a contact corresponding to Dave does not exist in Bob's contacts with Service A 402.

Having considered examples procedures related to social network mapping, consider now example implementations of devices, modules, and user interfaces that may be employed to provide techniques for social network mapping in one or more embodiments.

Example Device

Figure 5:
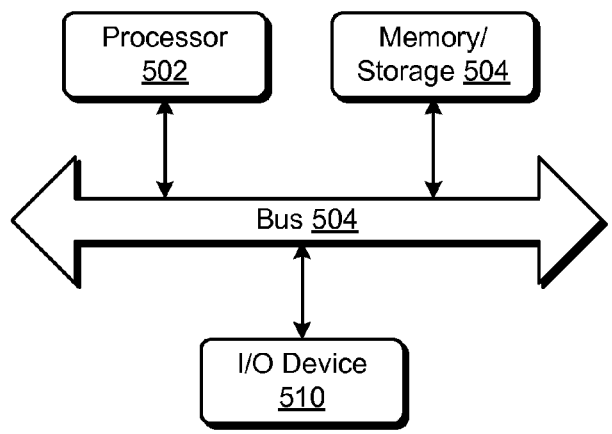
FIG. 5 is an illustration of an example device in accordance with one or more embodiments.

FIG. 5 illustrates an example computing device 500 that may implement the various embodiments described above. Computing device 500 may be, for example, a client 104 of FIG. 1, a server of a service provider 102, a server of a collaborative provider 106, or any other suitable computing device.

Computing device 500 includes one or more processors or processing units 502, one or more memory and/or storage components 504, one or more input/output (I/O) devices 506, and a bus 508 that allows the various components and devices to communicate one to another. The bus 508 represents one or more of several types of bus structures, including a memory bus or memory controller, a peripheral bus, an accelerated graphics port, and a processor or local bus using any of a variety of bus architectures. The bus 508 can include wired and/or wireless buses.

Memory/storage component 504 represents one or more computer storage media. Memory/storage component 504 may include volatile media (such as random access memory (RAM)) and/or nonvolatile media (such as read only memory (ROM), Flash memory, optical disks, magnetic disks, and so forth). Memory/storage component 504 may include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media may include a variety of available medium or media that may be accessed by a computing device. By way of example, and not limitation, computer-readable media may comprise "computer-readable storage media".

Software or program modules, including the mapping module 130, communication module 136, service manager module 114, and other program modules, may be embodied as one or more instructions stored on computer-readable storage media. Computing device 500 may be configured to implement particular functions corresponding to the software or program modules stored on computer-readable storage media. Such instructions may be executable by one or more articles of manufacture (for example, one or more computing device 500, and/or processors 502) to implement techniques for social network mapping, as well as other techniques. Such techniques include, but are not limited to, the example procedures described herein. Thus, computer-readable storage media may be configured to store instructions that, when executed by one or more devices described herein, cause various techniques for social network mapping.

Computer-readable storage media includes volatile and non-volatile, removable and non-removable media implemented in a method or technology suitable for storage of information such as computer readable instructions, data structures, program modules, or other data. Computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

Conclusion

Although the social network mapping techniques have been described in language specific to structural features and/or methodological acts, it is to be understood that the appended claims are not necessarily limited to the specific features or acts described. Rather, the specific features and acts are disclosed as example forms of implementing the social network mapping techniques.

What is claimed is:

1. A method implemented by a computing device comprising:
    detecting, by the computing device, initiation of mapping between a user's contacts associated with two services;
    responsive to the detecting, determining, by the computing device, matches of contacts in the two services that correspond to a same user by:
        comparing properties of each contact in one of the services with properties of contacts in the other service to derive matches based upon common properties between the contacts;
        obtaining contact lists from the two services describing contacts for unmatched contacts that remain after the comparing; and
        analyzing contacts for the unmatched contacts that remain from the obtained lists to determine additional matches based upon common contacts between the unmatched contacts.

2. A method as described in claim 1, further comprising combining contacts that correspond to the same user according to the matches to form combined contacts corresponding to the user.

3. A method as described in claim 2, further comprising employing the combined contacts in conjunction with one or more services made available from a service provider.

4. A method as described in claim 2, further comprising employing the combined contacts to enable collaborative interaction between the two services.

5. A method as described in claim 1, wherein the two services are provided by a single service provider.

6. A method as described in claim 1, wherein the two services are provided by different respective service providers.

7. A method as described in claim 1, wherein at least one of the two services comprises a social network service.

8. A method as described in claim 1, wherein at least one of the two services comprises an electronic messaging service.

9. A method as described in claim 1, wherein the two services correspond to social network services from different service providers and the contacts correspond to the user's friends with the social network services.

10. A method as described in claim 1 further comprising:
    obtaining contact data describing the user's contacts associated with the two services responsive to the detecting;
    constructing a representation of the user's contacts for each of the two service based on the contact data; and
    using the constructed representations to perform the determining, comparing, and analyzing.

11. A method as described in claim 1, wherein analyzing the contacts of the unmatched contacts comprises determining the common contacts between the unmatched contacts by comparing properties of the contacts of the unmatched contacts one to another.

12. One or more computer-readable storage media storing instructions that, when executed by a computing device, cause the computing device to perform a method comprising:
    ascertaining common properties between a user's contacts with two services;
    identifying common contacts associated with the user's contacts from contact lists for the user's contacts obtained from the two services; and
    determining matches of a user's contacts that correspond to a same user based upon the common properties and the common contacts.

13. One or more computer-readable storage media as described in claim 12, wherein the method caused by the instructions further comprises exposing an application programming interface (API) that is operable by one or more clients to cause the ascertaining, indentifying, and determining.

14. One or more computer-readable storage media as described in claim 12, wherein the two services correspond to social network services from different service providers and the contacts correspond to the user's friends with the social network services.

15. One or more computer-readable storage media as described in claim 12, wherein the method caused by the instructions further comprises presenting contacts of the user that remain unmatched following the determining to the user to enable the user to manually input matches.

16. One or more computer-readable storage media as described in claim 12, wherein the determining matches further comprises:
    establishing a confidence threshold that defines when the common properties and common contacts between two of the user's the contacts are sufficient to conclude that the two contacts correspond to the same user; and
    assessing whether the confidence threshold has been met to determine the matches.

17. One or more computer-readable storage media as described in claim 12, wherein the method caused by the instructions further comprises detecting a request to initiate mapping of the user's contacts and in response to the request:
    examining an account associated with the user to identify the two services;
    interacting with both of the two services to obtain representations of the user's contacts with each of the two services; and
    conducting the ascertaining, identifying, and determining using the obtained representations.

18. A system comprising:
    one or more processors; and
    one or more computer-readable storage media storing instructions that, when executed via the one or more processors, cause the one or more processors to implement a mapping module configured to:
    receive a request to sync friends of a user associated with two social networks;
    obtain representations of the user's friends with the two social networks responsive to the request, the representation configured to relate the friends to a plurality of properties;
    identify friends of the user's who are the same in the two social networks using the representations by at least:
        comparing the plurality of properties of each friend in one of the social networks with the plurality of properties of friends in the other social network to identify matching friends based upon common properties between the friends; and
        performing a friend of friend analysis for unmatched friends that remain after the comparing to obtain contact information describing contact of the unmatched friends from the two social networks and identify additional matching friends based upon a number of common friends between the unmatched friends that is determined by the friend of friend analysis; and construct a combined representation of the user's friend's with the two social networks that merges friends identified as the same.

19. A system as described in claim 18, wherein the mapping module is further configured to output the combined representation to providers of the two social networks to enable collaborative interactions between the providers.

20. A system as described in claim 18, wherein the representations are graphical representations and the mapping module is further configured to interact with the two social network services to construct the graphical representations.

* * * * *